Dec. 30, 1969   E. H. GEIBEL   3,486,529
VALVE CONTROL ASSEMBLY
Filed Feb. 26, 1968   5 Sheets-Sheet 1
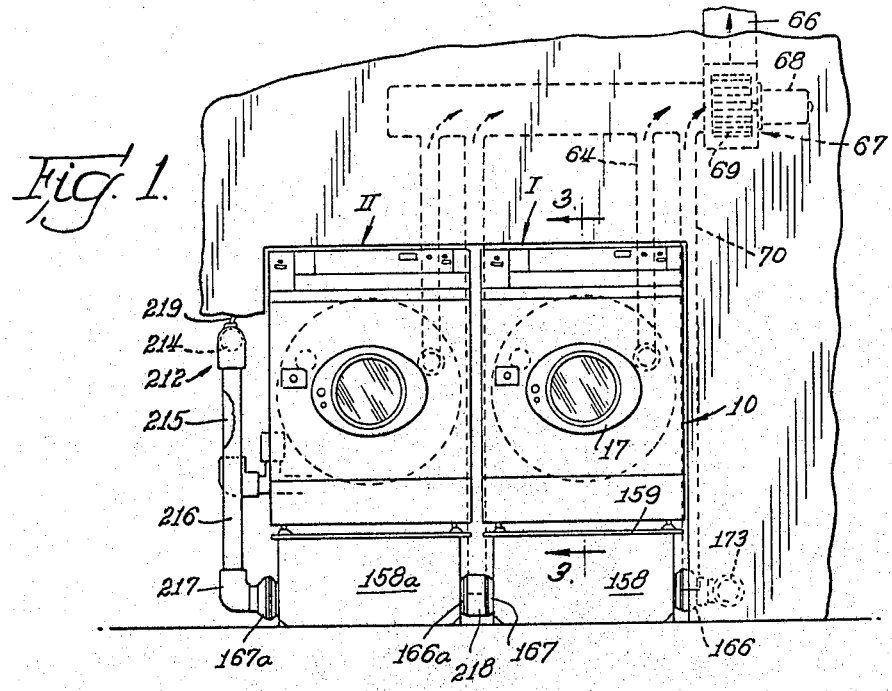
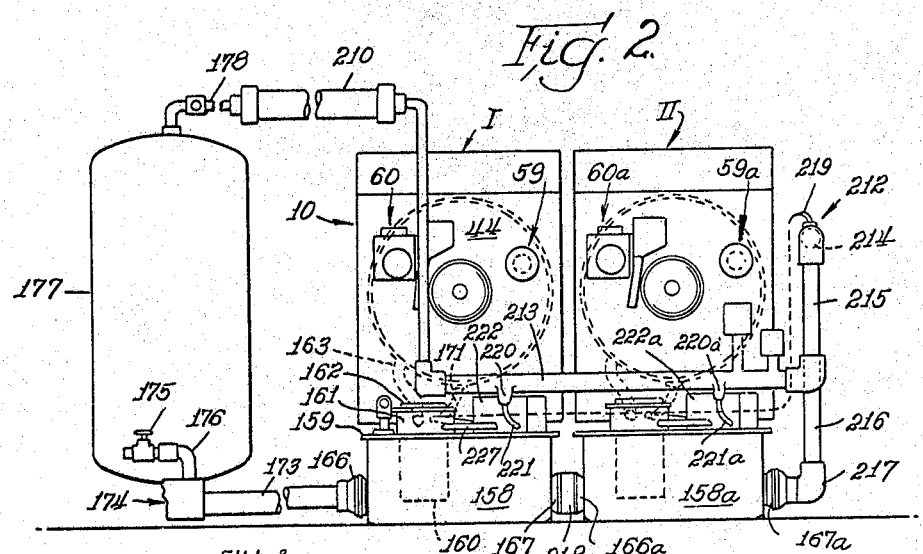
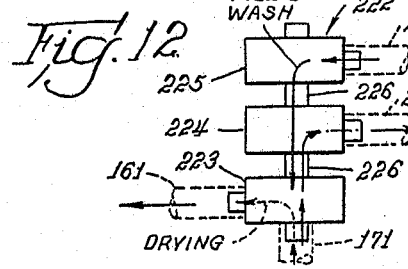
Inventor
Emmett H. Geibel
By
Att'y.

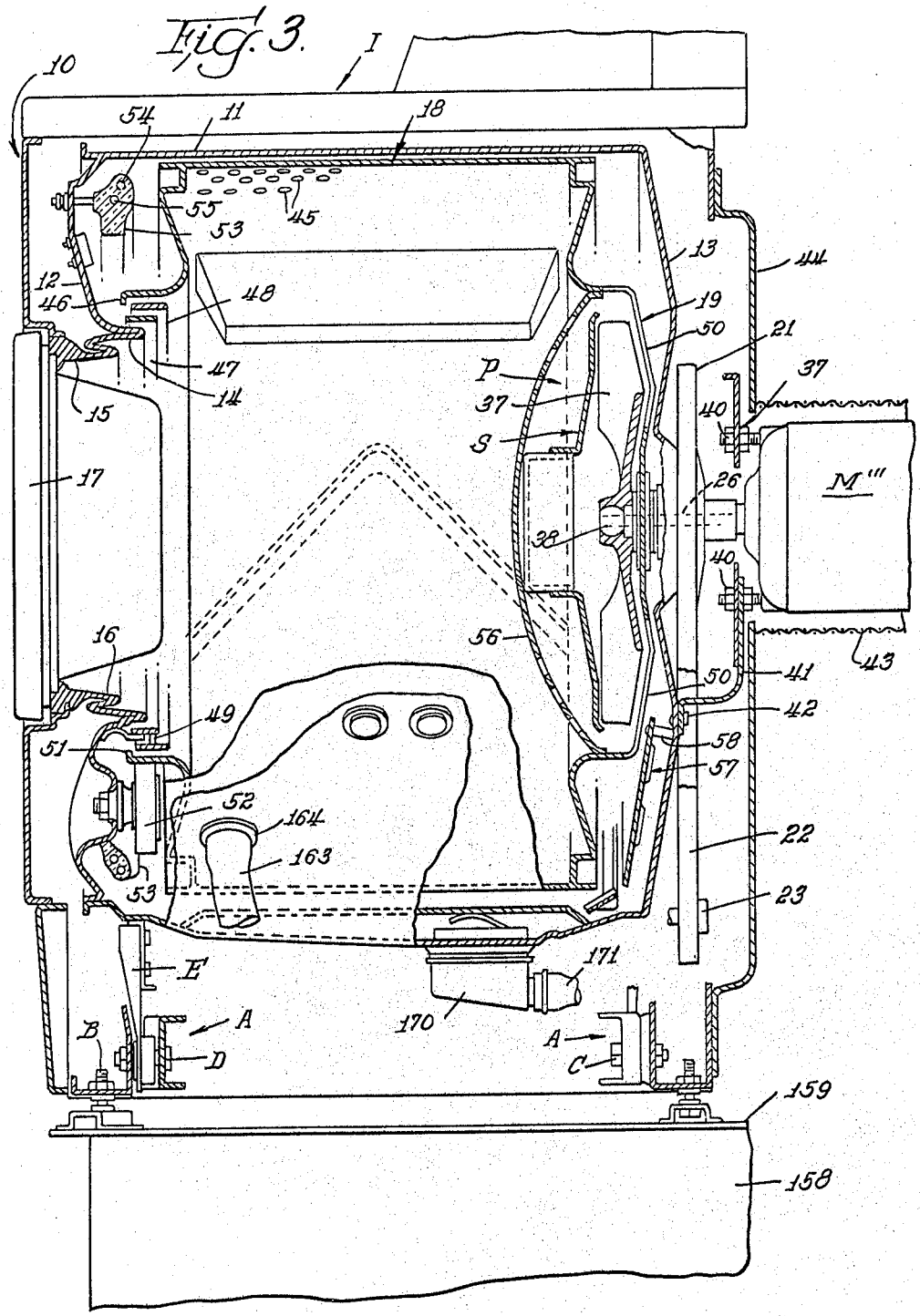

Dec. 30, 1969  E. H. GEIBEL  3,486,529
VALVE CONTROL ASSEMBLY

Filed Feb. 26, 1968  5 Sheets-Sheet 3

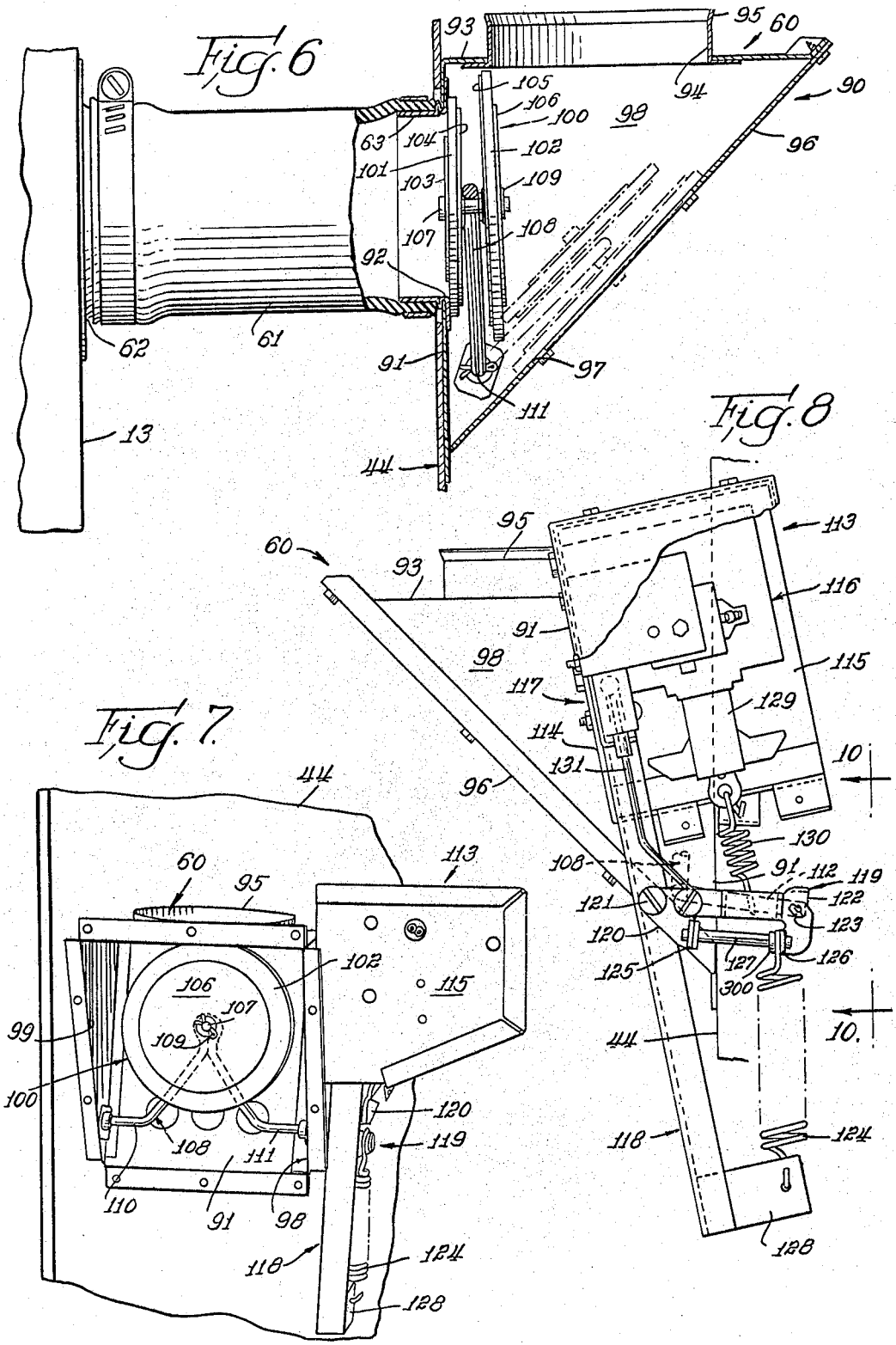

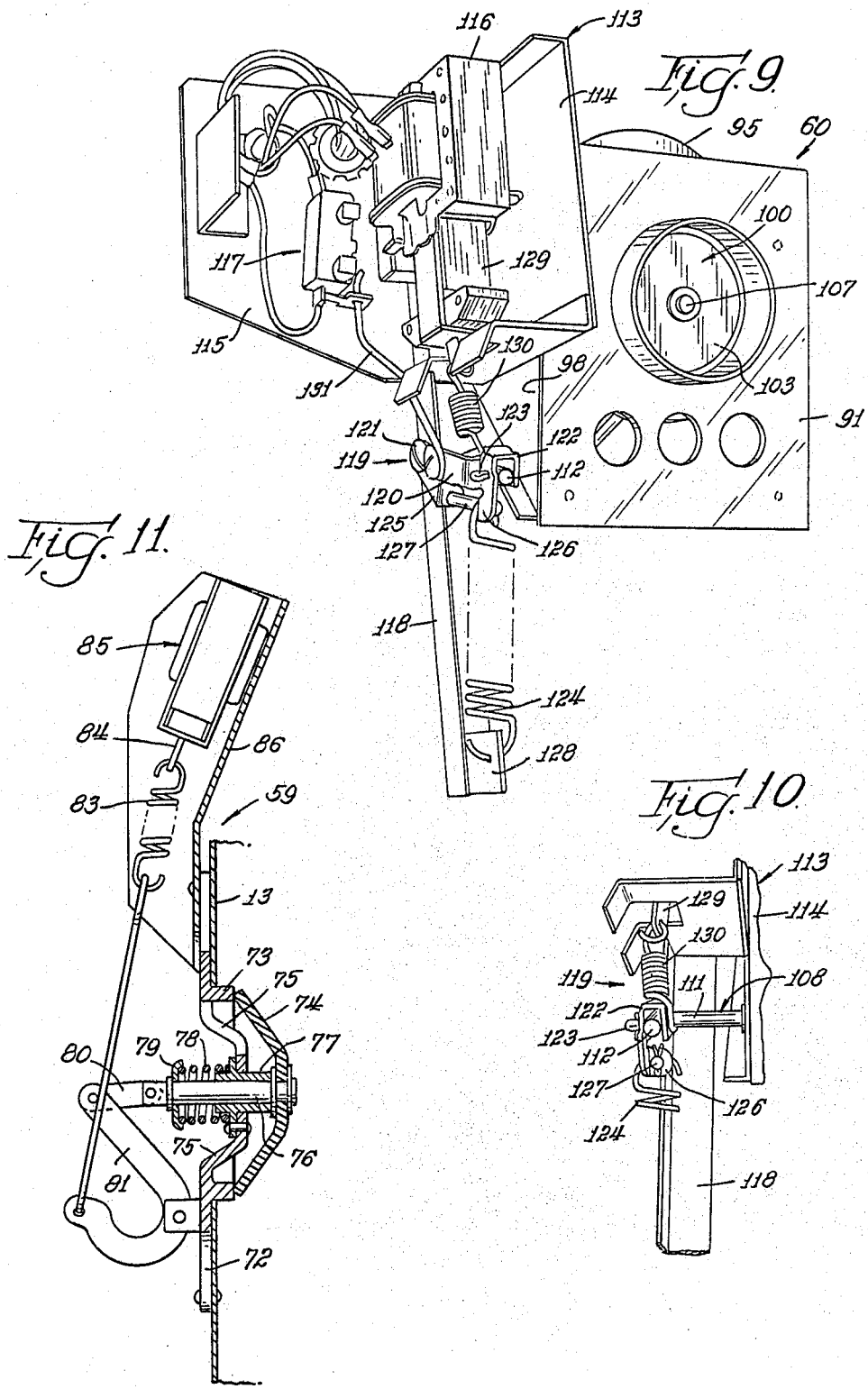

United States Patent Office

3,486,529
Patented Dec. 30, 1969

3,486,529
VALVE CONTROL ASSEMBLY
Emmett H. Geibel, Effingham, Ill., assignor, by mesne assignments, to Fedders Corporation, a corporation of New York
Filed Feb. 26, 1968, Ser. No. 708,043
Int. Cl. D06f *43/00;* F16k *11/10, 51/00*
U.S. Cl. 137—625.4                                                17 Claims

ABSTRACT OF THE DISCLOSURE

A control for a diverter valve assembly having a valve housing provided with a fluid passage defined by spaced entrance openings and an exit opening, and a valve gate pivotally mounted on the housing; the control including a lever having one end connected to the gate for movement of the gate to alternately cover the entrance openings, a coil spring having one end connected to the housing with its other end engaging the other end of the lever so that the lever exerts maximum force on the gate to close one of the entrance openings, and a solenoid connected to and energizable to operate the lever to pivot the gate to close the other entrance opening and to cause the spring end, engaging the lever, to slide toward, and be positioned adjacent, the lever pivot to unload the spring.

---

This invention relates to a valve control assembly.

An object of the invention is to provide a new and improved control arrangement for a swing type valve.

Another object of the invention is to provide a new and improved valve control arrangement including a lever operating a swing type valve, and means for modifying the mechanical advantage of the lever during movement of the valve to two different fluid-control positions.

Another object of the invention is to provide a new and improved valve control arrangement including a lever-operated pivotal valve gate movable to one of two fluid passage-controlling positions by a spring acting on one end of the lever to provide maximum force to the gate in one position thereof, and force-applying means actuatable to pivot the lever to the other position thereof and to move the spring along the lever toward the lever pivot to unload the spring.

A specific object of the invention is to provide a new and improved control arrangement for a diverter valve having a housing for a valve gate movable to divert fluid alternately from spaced entrance passages in the valve to an exit passage, the control arrangement including a lever having one end connected to the gate for pivotal movement of the gate, a pin connected to the lever and extending parallel to the lever, a coil spring having one end connected to the housing and its other end engaging the pin adjacent the other and free end of the lever so that the lever exerts maximum force on the gate to close one of the entrance passages, the lever being rotatable by a solenoid energizable to move the valve to close the other entrance passage while the spring end, engaging the pin, moves toward the lever pivot to unload the spring by reducing the spring force acting to return the solenoid to its initial deenergized position.

These and other objects and advantages of the invention will appear more clearly from the following specification in connection with the accompanying drawings, in which:

FIGURE 1 is a front elevation of a dry cleaning system including two combination cleaning and drying machines, and a ventilating arrangement therefor;

FIGURE 2 is a rear view of the dry cleaning system and including an air inlet valve and the improved exhaust valve of the machines forming portions of the ventilating arrangement;

FIGURE 3 is a vertical sectional view of one of the machines, said section being taken along line 3—3 of FIGURE 1, and illustrating interior parts of the machine including a fluid-containing receptacle, a fabric-receiving basket, an air-circulating fan, and means for rotatably mounting the basket and fan on the receptacle;

FIGURE 6 is an enlarged side elevational view of the improved exhaust valve of the machine shown in FIGURE 2, said view being partly in section to more clearly illustrate the movable air-flow diverter gate thereof;

FIGURE 7 is a front elevational view of the valve shown in FIGURE 6, the front plate of the valve housing being removed to more clearly illustrate the movable gate;

FIGURE 8 is a side elevation of the valve shown in FIGURE 7 and illustrating the mechanical and electrical control components for operating the valve;

FIGURE 9 is a perspective view of the valve shown in FIGURES 6–8;

FIGURE 10 is a view illustrating a portion of the mechanical control components of the valve, said view being taken on line 10—10 of FIGURE 8;

FIGURE 11 is a vertical sectional view of the inlet air valve shown in FIGURES 2 and 4; and FIGURE 12 is a diagrammatic view of a control valve arrangement for the dry cleaning solvent.

Figures 4, 5:
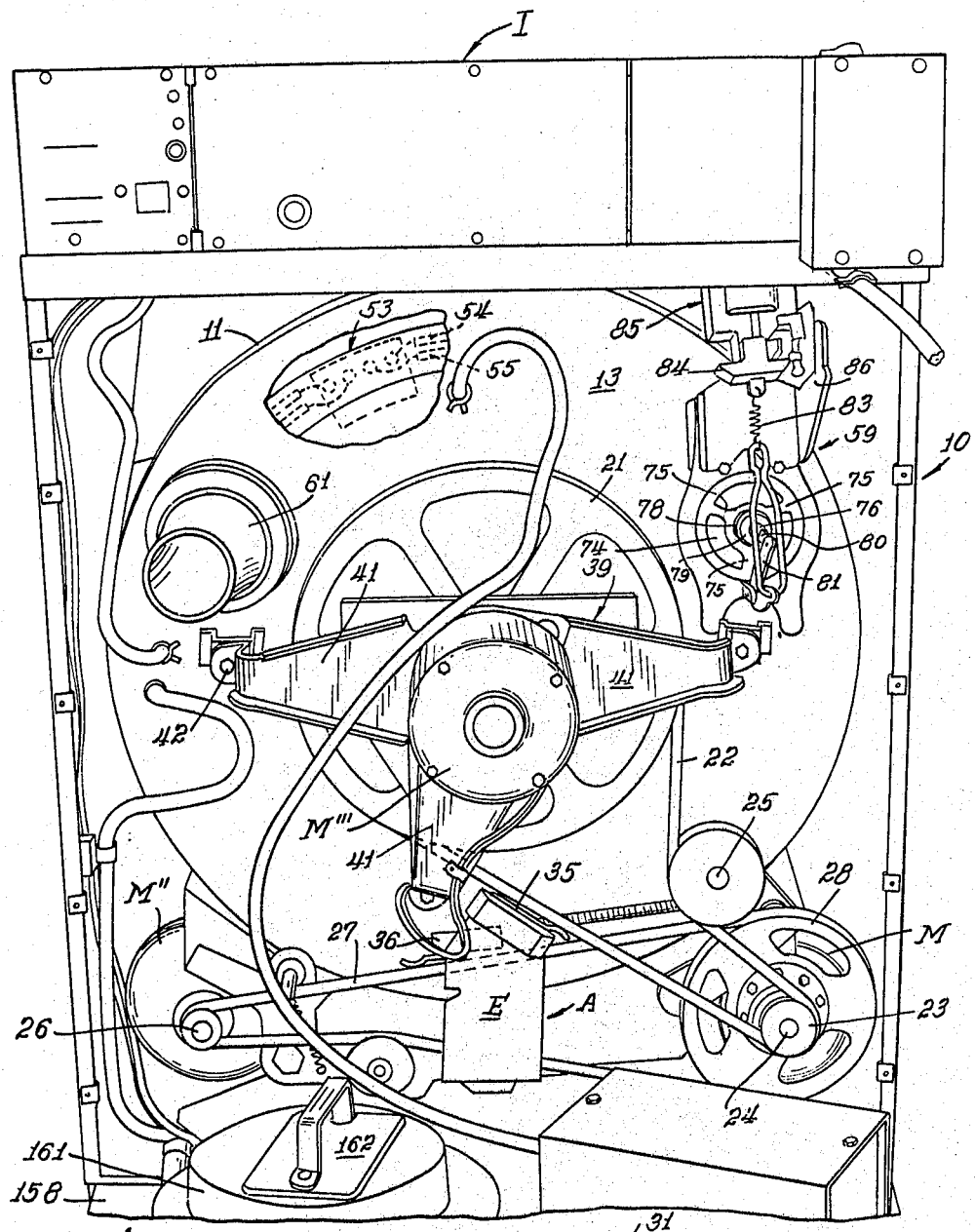
FIGURE 4 is a rear elevational view of the machine shown in FIGURE 3, illustrating the drive arrangements for rotating the basket and fan and including belt and pulley drives.
FIGURE 5 is an enlarged sectional view of a one-way clutch associated with the basket-rotating belt and pulley drive.

Referring now to the drawings, FIGURES 1 and 2 illustrate a dry cleaning system adapted for a plurality of combination fabric-cleaning and drying machines indicated at I and II, although the system may be employed with a single machine. As each of these machines are identical in construction and operation, it is believed the description of one of the machines (machine I) will be adequate to an understanding of each machine structure and operation. Identical structural parts of machine II are designated with the same numeral as machine I but with the suffix *a*. The structure of machine I is illustrated in FIGURES 3, 4 and 5 and comprises a cabinet 10 receiving a cleaning fluid-containing receptacle in the form of an imperforate cylindrical casing or tub 11 having a front wall 12 and a rear wall 13. The tub 11 is supported by a suspension system of the inverted pendulum type generally indicated at A mounted on a base structure B, the suspension system A comprising pivots C and D attaching the tub to the base structure B for operating movement of the tub, the pivots C and D being directly below the center line of the tub and being connected to the bottom of the tub by a pair of front and rear brackets, one of which is shown at E. Control springs (not shown) can be located on opposite sides of the tub, and these springs, in conjunction with an hydraulic damper assembly are effective to control the tub movement during rotation of a cylindrical fabric-containing basket or drum 18 at high speed with an unbalanced load of fabric, such as clothes, in the basket. The suspension system arrangement of the tub is more particularly shown and described in U.S. Patent 2,978,892 issued Apr. 11, 1961. The front wall 12 of the tub 11 is provided with an access opening 14 and a corresponding opening 15 is in the cabinet 10. A flexible convoluted gasket 16 extends between and connects the annular portions of the front walls of the tub and cabinet defining two openings, and the cabinet is provided with a door 17 to close the opening in the tub.

The basket or drum 18 is disposed in the tub 11 for the reception of fabric to be cleaned and dried and the basket is supported by means of a spider 19, forming a portion of the rear wall of the drum, on a sleeve shaft 20 fixed to the drum and rotatably mounted on the rear wall 13 of the tub 11 for rotation of the drum 18. A pulley 21 is fixedly secured to the shaft 20 to rotate the drum and receives a belt 22 engaging a driving pulley 23 connected to the driven shaft 24 of an electric motor M' mounted on the base B. An idler pulley 25 is supported for pivotal movement and is spring-actuated to bear against the belt 22. A second motor M'' is mounted on the tub 11 and has its drive shaft coupled to a pulley 25 engaging a belt 27 surrounding a pulley 28 on the driven shaft 24 of the motor M'. As shown in FIGURE 4, a one-way clutch 29 is disposed between the shaft 24 and pulley 28 and comprises a plurality of sprags 30 and rollers 31 carried by a cage 32, the sprags having wedging engagement with a spaced motor hub 33 and collar 34 upon rotation of the pulley 28 in a counterclockwise direction when the motor M'' is operative. As a result, this clutch action drives the motor shaft 24 through the keyed hub 33 and thereby rotates the pulley 23 to turn pulley 21 and basket 18 at a low clothes-tumbling speed (46 r.p.m.) for a fabric-cleaning operation. During this operation, the motor M' is de-energized and acts as a jackshaft. After a predetermined time period, the motor M' is energized and its shaft 24 will rotate in a counterclockwise direction. Since the motor M'' is also energized, the clutch 29 will over-run the pulley 28 and drive the basket 18 at a high speed, approximately 285 r.p.m. Since the hub 33 is keyed to the motor shaft 24, the motor M' is directly driving the basket at a speed effective to extract the cleaning fluid from the fabrics.

A blower fan 37 is positioned within the basket 18 and connected to one end of the shaft 38 extending through the sleeve shaft 20 supported on the rear wall 13 of the tub 11 and rotatably mounting the basket 18. The shaft 38 is connected to the drive shaft of the motor M''' positioned on a mounting bracket 39 and secured thereto by bolts 40, as shown in FIGURES 3 and 4, the bracket 39 having laterally extending arms 41 bolted as at 42 to the rear wall 13 of the tub. The motor is received within a housing 43 forming a centrally located portion of the rear wall 44 of the cabinet. The described blower fan and basket mounting arrangement permits independent or concurrent rotation of the fan and basket.

Referring to FIGURE 3, the cylindrical wall of the basket 18 is perforated to provide openings 45 therein. The basket front wall is provided with an opening 46 spaced from the access opening in the front wall 12 of the tub 11. An annular ring 47 is suitably attached to the front wall 12 of the tube 11, and a second annular ring 48 is attached to the ring 47 and spaced therefrom by pins or rivets 49. The rear wall of the basket 18 is provided with a pocket P formed by the legs of the spider 19 merging with the cylindrical portion of the basket extending about the rotational axis of the basket, the pocket P having a plurality of openings 50 defined by the legs of the spider 19. The front of the basket 18 has a cylindrical flange 51 defining the opening 46, and the front wall 12 of the casing 11 has a pair of bearing rollers 59 secured thereto to support the front of the basket. Air circulating means, in the form of the suction type blower fan 37, is rotatably mounted in the pocket P in the rear wall of the basket 18.

In FIGURES 3 and 4, an annular heater assembly 53 is fixedly secured to the front wall 12 of the tub 11 and includes an aluminum body having embedded annular armored type heating coils 54 and 55 suitably connected to a supply of electric current controllable to energize one or the other, or both, heating coils of the heater assembly during the drying operation of the machine. During this drying operation, the basket is rotated slowly to tumble the fabric and the fan is effective to cause the heater air to circulate and flow between the tub and basket and around the basket and through the perforations in the basket to dry the clothes in the basket. The heated air is then drawn through a perforated plate 56 and lint screen S by the fan and through the pocket P of the basket and through the openings 50 defined by the spokes of the basket rear wall spider 19 and into the space between the basket and the rear wall 13 of the tub to be recirculated in the machine. As it is contemplated the machine will be used with a dry cleaning solvent, such as perchlorethylene, vaporizable during the drying operation, a condenser, generally indicated at 57, is positioned adjacent the lower portion of the wall 13 of the tub 11 for condensation of the solvent vapors produced by the drying operation. The condenser passages are connected to a water inlet hose and conduct the water to a hose leading to a drain exteriorly of the machine. As seen in FIGURE 3, the condenser is mounted on the inside of the rear wall 13 of the casing 11 by securing means 58.

Referring now to FIGURES 4 and 11, the drum 11 has the upper portion of its rear wall provided with an air shutter in the form of an air inlet poppet valve, generally indicated at 59, operative to permit air to enter the tub 11. As shown in FIGURES 2 and 6, an air exhaust diverter valve, generally indicated at 60, is mounted on the cabinet rear wall 44 and communicates with the tub interior by a connector hose 61 extending between the wall 44 and tub rear wall 13 with the terminal ends of the hose surrounding and being clamped to cylindrical flanges 62 and 63 of the walls to provide an air passage between the tub and valve. The function of the inlet valve 59 is to permit air to enter and flow through the tub so that all the noncondensable solvent vapors may be flushed and discharged from the machine through the exhaust valve 60 at the end of the drying cycle of the machine and carried away by a ventilating system. In addition, when the door is open, the exhaust valve 60 is controllable to be in open position to permit the flow of room air into the machine for mixture with the solvent vapors and discharge through the valve to the exterior of the building housing the machine. The valves 59 and 60 are normally closed during the cleaning and drying cycles of the machine.

The ventilating system includes an air intake opening in the wall 13 of the tub 11, through which flow of air into the machine is controlled by valve 59, the air entering and mixing with the solvent vapors and the mixture then being discharged through the valve 60 into an air duct 64 (FIGURE 1) and a plenum duct 65 and through an exhaust duct 66 into the atmosphere exterior of the building. The duct 65 has a blower 67, including an electric motor 68 and a fan 69, for causing air flow into and through the machine and into the ventilating system ducts. During operation of the blower fan, any vapor-laden air about the machine is also drawn through a scavenger duct 70 extending upwardly into the duct 65 for exhaust by the blower fan.

The poppet valve 59 is shown in detail in FIGURES 4 and 11 and comprises valve body or plate 72 secured to the wall 13 of the tub 11 and provided with an annular flange 73 fitting within an opening in the tub rear wall 13 and providing a seat for a flexible seal 74 within the tub to prevent air flow between the three spaced legs 75 of the valve body from the machine. The seal is fixed to one end of an activating rod 76 and is normally held engaged with the flange 73 by the rod being slidably mounted within a sleeve 77 secured to the radially inner ends of the legs 75, the rod having a surrounding spring 78 compressed between a flange on the sleeve 77 and a retainer washer 79 on the rod 76 to close the valve. The rod 76 is pivotally connected to a link 80 which is connected to one end of a lever 81 centrally pivoted to spaced ears on the valve plate 72, the other end of the lever 81 being connected by a wire link 82 to a spring 83 coupled to the plunger 84 of a solenoid 85 mounted on a bracket 86 fixed to the tub rear wall 13. The valve is shown in closed position in FIGURE 11, the solenoid being deenergized at this time. Upon energization of solenoid, the plunger 84 will move upwardly to cause lever 81 to rotate to move rod 76 to disengage seal 74 from the flange 73 to permit air to flow into the tub 11 through the valve 59. When the solenoid is deenergized, the valve will close, as the compressed spring 78 will expand and the link and lever arrangement causes seal 74 to again seat against the flange 73.

Referring now to the exhaust valve 60 shown in FIG-URES 1, and 6 to 10, inclusive, the valve comprises a housing 90 of triangular section as viewed in FIGURES 6, 7 and 8 and having its rear wall 91 provided with an opening 92 defined by the cylindrical flange 63 thereof; a top wall 93 having an opening 94 defined by an upwardly projecting cylindrical flange 95 received within the duct 64; and inclined removable front wall 96 extending between the top and rear walls and provided with an opening 97. The housing also includes spaced side walls 98 and 99 extending between and connected to the walls 91, 93 and 96 to provide a passage for air from the hose 61 and the interior of the machine to the opening 94 in wall 93 and to the ducts 64 and 65 and exhaust duct 66 of the ventilating system, or alternatively, to afford a passage for room air through the opening 97 in the front wall 96 to the ducts 64, 65 and 66.

Flow of air from the machine or room to the ventilating duct system is controlled by a gate, flapper member, or damper 100 pivoted on the side walls 98 and 99 of the valve housing for movement to positions covering the openings 92 or 97. More particularly, the gate 100 comprises seals 101 and 102 of a suitable material, such as acrylonitrile, the seal 101 functioning to close the opening 92 of the valve housing, and movement of the gate causing the seal 102 to close the opening 97 of the housing. The seal 101 is positioned between two metal plates 103 and 104 and the seal 102 between two similar plates 105 and 106. A clevis pin 107 extends through aligned openings in the seals and plates and also through a loop of a V-shaped activating lever 108, the pin having a cotter pin 109 in one end thereof to maintain the seals, plates and lever in assembly. The lever 108 has aligned portions 110 and 111 extending into the side walls 98 and 99 of the housing 90 for pivotally supporting the seals, the portion 111 extending outwardly of the housing and merging with an offset arm 112 movable to pivot the gate 100.

The new and improved control arrangement is directed to the exhaust valve assembly 60 and is shown in FIG-URES 6–10, inclusive. More particularly, the control arrangement includes actuating means for the valve gate 100 which are, mounted on a bracket 113 provided by angularly disposed walls 114 and 115 with the wall 114 being secured by screws to the wall 98 of the valve housing, and the wall 115 mounting a solenoid 116, a switch 117, and an angle bar 118, as shown in FIGURES 7–10. The bar 118 extends downwardly of the bracket and supports mechanism 119 operably connecting the solenoid, switch and gate-activating lever. It will be noted the mechanism 119 comprises a lever 120 pivotally mounted at one end on the bar 118 by a shoulder bolt 121, the lever is parallel to the arm 112 of the lever 108, and the arm 112 extends through a bifurcate or U-shaped end 122 of the lever 120 and is connected thereto by a cotter pin 123 so that relative movement of the levers can occur upon actuation of the lever 120 by the solenoid 116 and biasing means in the form of a spring 124. The lever 120 is formed with downwardly projecting spaced ears 125 and 126 respectively located adjacent the pivot 121 and at the bifurcated end 122, the ears having aligned openings for receiving a pin 127 fixed to the ears by cotter pins as shown in FIGURES 8, 9 and 10. The coil spring 124 has its upper end hooked about an annular carrier 300 surrounding and slidable on the pin 127 and its lower end engaging a laterally extending arm 128 of the bar 118 so that, upon pivotal movement of the lever 120, the upper end of the spring 124 and the carrier 300 can move along the pin 127. The spring 127 normally positions the levers 108 and 120 as shown in FIGURES 8, 9 and 10 to insure the valve seal 101 of gate 100 closing the opening 92 of the valve housing as in FIG-URE 6. To move the valve gate to position its seal 102 to close the opening 97 of the housing, the solenoid 116 is energized to raise its plunger 129 and thereby spring 130 connected to the plunger and to the lever arm 112, so that the levers 108 and 120 rotate in a counterclockwise direction (FIGURE 8). During this movement, the upper end of the spring 124 and its carrier 300 slides to the left along the pin 127. Also, switch 117 has its normally-open contacts closed by movement of a wire actuator 131 connected to the lever 120 by the loop end of the actuator engaging a shoulder screw on the lever.

It will be apparent that the valve-actuating arrangement locates the pivot 121 for the lever 120 with respect to spring 124 and to the forces exerted on the levers 108 and 120 by the spring 124, in a manner so that, when the spring is in its position, as shown, in spaced relation to the lever pivot 121, the spring will cause maximum leverage force on the valve gate 100 to insure seal 101 tightly closing the opening 92 of the housing 90. However, upon energization of the solenoid and movement of the levers in a counterclockwise direction (FIGURE 8) to remove the valve gate from opening 92 and to close opening 97 of the valve housing, the upper end of spring 124 slides along the pin 127 to a position adjacent the lever pivot 121 to thereby diminish the spring force on lever 120 and unload the spring to relieve and decrease the force of the spring 130 necessary to return the solenoid to its deenergized position. Upon deenergization of the solenoid, the tension of spring 124 will cause the lever 120 to rotate in a clockwise direction and the upper end of the spring will slide along the pin 127 away from pivot 121 and to its extreme right position for exerting maximum leverage force on the lever 120 and thereby lever 108.

The cleaning fluid supply system utilized with the machines is disclosed in U.S. Patent 3,273,256 issued Sept. 20, 1966, to C. E. Behrens and assigned to Borg-Warner Corporation. Briefly described, the system has been designed to provide a constant flow of clean, filtered cleaning fluid or solvent, such as perchloroethylene, to each machine during the fabric-cleaning cycle, each machine having an overflow arrangement to expel the soiled solvent from the machine to a solvent storage base tank of the machine for flow of the solvent to a pump and then to a filter for removing soil and other impurities from the solvent and for recirculation of the cleaned solvent to the machine. The filtered solvent is supplied to each machine by a manifold providing a metered quantity of cleaning solvent to each machine with a proper solvent level or height being constantly maintained in the machines by the location of the solvent overflow pipe in the machine.

Referring now more particularly to the closed fluid supply system, machine I has its base structure B supported above and on a rectangular solvent storage tank indicated at 158, the tank including a top plate 159 enclosing the top of the tank and on which the machine is mounted. The top plate 159 of the tank is provided with a basket-type screen filter 160. A cylindrical header 161 is positioned on and may be welded to the top plate 159, the header extending upwardly and having its upper end closed by a removable cover 162 to prevent the escape of solvent vapors from the tank and filter. The header 161 is provided with a laterally extending tubular portion for attachment to one end of a hose 163. As seen in FIGURES 2 and 4, the hose extends along the top of the tank and upwardly for connection to a tubular extension 164 of tub 11 and defining an opening 165 within the cylindrical wall of the tub located a predetermined distance above the bottom of the tub.

The opposite sides of the tank have substantially large, tubular extensions 166 and 167, the tubular extension 166 providing a fluid inlet passage for solvent entering the tank and the tubular extension 167 providing a fluid outlet for the solvent from the tank. Referring to FIGURE 3, a sump elbow 170 is located in and connected to the bottom of the tub of the machine, the elbow 170 having a laterally extending tube receiving one end of a hose 171.

Solvent is supplied to the tub of the machine through the hose 171 and, as the solvent enters the tub, the solvent rises to a predetermined level defined by the opening 164 in the side wall of the tub and through which the solvent overflows from the tub into the hose 163 and the lint filter basket 160, lint being filtered from the solvent and the solvent then being added to and mixed with solvent circulating through the tank by way of tubular extensions 166 and 167.

The tubular fluid outlet extension 167 of the base tank of machine I is connected to a pipe 173 effective to direct the soiled solvent to a circulating pump 174, the pump causing the solvent to be forced under pressure through an open check valve 175 and a pipe 176 into the bottom of the filter 177. The soiled solvent enters the filter 177, adjacent the bottom thereof, through the pipe 176, and filtered clean solvent flows from an outlet at the top of the filter into pipe 178 elevated above the top of the filter. Solvent flows from the filter 177 into the pipe 178 which extends through a water-cooled heat exchanger 210 and to the pipe 211 connected to a horizontal manifold pipe 213. An inverted U-shaped assembly 212 includes a horizontal pipe 214 and two vertical pipes 215 and 216, the pipe 213 being connected to pipe 211. The pipe 215 functions as a standpipe and is connected to pipe 213 and the solvent is forced upwardly through pipe 215 and flows into pipe 214 and then downwardly into the overflow pipe 216, pipe 216 terminating in a pipe 217 positioned in a horizontal plane below that of pipe 213. The pipe 217 has its outlet end connected to the inlet tubular extension 167a of the side wall of the solvent storage base tank 152a of machine II so that the filtered solvent flows into and through the base tank of machine II for mixture with the soiled solvent entering the tank from the overflow hose and the lint filter basket of machine II when machine II is in operation, the solvent then flowing through a pipe 218 connecting outlet tubular extension 166a with the inlet tubular extension 167 of base tank 158 of machine I for mixture with the soiled solvent overflowing the tub of machine I and for flow therethrough and the outlet tubular extension of tank into the pipe 173 to the pump for recirculation through the filter, the assembly 212, and the storage base tanks of machines I and II. A vacuum breaker hose 219 is connected to the top of pipe 214 and also to the headers 161 and 161a of the storage tanks 158 and 158a. The function of the standpipe 215 is to provide a pressure, caused by an active head of solvent, for feeding solvent by gravity into the tanks and tubs of the dry cleaning machines I and II.

Solvent is fed into the tub of each machine by the manifold pipe 213 provided with downwardly extending tubular portions 220 and 220a connected respectively to hoses 221 and 221a which are connected to identical diverter valve assemblies 222 and 222a. Each diverter valve assembly comprises three solenoid-operated valves 223, 224 and 225 (FIGURE 12) with the valve 225 direction solvent from the hose 221 into and through the valve assembly 222 and into the hose 171 and the tubular extension 170 of machine I, the solvent flowing into the machine until it reaches a level equal to the height of the overflow opening 164 in the tub of the machine for flow therefrom into the hose 163 and into the filter basket and storage base tank.

Referring to the valve assembly 222, the flow of the solvent through the valve assembly 222 is diagrammatically shown in FIGURE 12 in which, briefly described, the fluid enters the assembly through the hose 221 from pipe 213 and flows through the valve 225 into a common passage 226 through the valve assembly for all of the valves of the assembly, valves 224 and 223 having solenoids (not shown) which are deenergized and at this time, these valves being ineffective to divert the solvent from the passage. Accordingly, assuming the valve 224 is opened by energization of its solenoid and the solvent passes therethrough and into and through the passage 226 to flow outwardly of the valve assembly and into and through the hose 171 into the tub of the machine during the fill and cleaning cycle of the machine. This flow of the solvent is diagrammatically illustrated in FIGURE 12. During the drain and extraction periods of the cleaning cycle of the machine, the valves 225 and 223 have solenoids (not shown) which are deenergized so that these valves are closed, and the valve 224 is open as its solenoid is energized so that the solvent flows from the tub sump and through hose 171 into the passage 226 of the valve assembly and through valve 224 into the hose 227, connected to the header 161, for flow of the solvent into the storage base tank. During the drying cycle, the valve 223 is open and the valves 224 and 225 are closed. The solvent vapors are condensed by the condenser 57 into liquid solvent which drains from the hose 171 into the passage 226 to flow through open valve 223 into a hose connected to the header 161.

Referring now to FIGURE 12, it will be assumed that the tub of machine I is empty of solvent and that solvent is continuously flowing through the manifold pipe 213, the standpipe 215, and overflow pipes 214 and 216 into and through the storage tanks of the machines. As the solenoid of the valve 225 is deenergized, the solvent will not flow from the hose 221 into machine I. To permit the solvent from the manifold pipe to enter the hose and the machine, the solenoid of valve 225 is energized to open the valve. At this time, it may be noted that the valve 225 is open so that solvent entering the hose 221 flows through the valve and into the valve 224. As the solenoids of valves 224 and 223 are deenergized, the solvent flows through the aligned chambers of the valves and through hose 171 into the tub of the machine.

Accordingly, from the description of the operation of the diverter valve assembly 222, it will be apparent that the solvent may flow from the manifold pipe to either or both of the machines, depending upon the selective opening or closure operation of the valve assemblies 222 and 222a as desired by the operator of the dry cleaning system. After the clothes are cleaned by the solvent for a predetermined time period, and assuming machine I is only in use, the tub of machine I may be drained by closing the valve 225 and opening the valve 224 while maintaining the valve 223 closed, the solvent then drains from the tub of the machine through the hose 171, chamber of valve 223 and, as the closure member of valve 224 is now open, the solvent is diverted into and passes into hose 227 extending through one side of the header 159 and into the filter basket and storage base tank for circulation by the pump to the filter 177.

The present dry cleaning system is adapted also to dry the clothes and, for this purpose is provided with the heater assembly 53 and fan 37 to cause the heated air to be circulated throughout the dryer for drying the cleaned clothes. During this time, cooling water may be circulated through condenser 57 to condense the vaporized solvent, the solvent flowing down the walls of the tub and into the hose 171. At this time, the valve 225 and the valve 224 are closed and the solenoid of valve 223 is energized to open valve 223 so that the condensed solvent flows through the hose 171 into the valve 223 and into a hose connected to the header 159 of the tank 152 for passage of the solvent into the lint basket and thence into the storage tank 152 of the machine.

What is claimed is:

1. In a control arrangement for a valve having a housing with spaced passages; a valve element in said housing and pivotally connected to said housing for movement to selectively close and open said passages; actuating means for moving said valve element and including a lever connected to said valve element and operative to move said valve element; a spring operative to exert force on said lever and thereby said valve element to close one of said passages; means for operating said lever to move said valve element, in opposition to force exerted by said spring, to close the other of said passages; and mechanical means including a slidable connection between said spring and said lever for modifying the spring force acting on said lever during operation of said lever-operating means.

2. In a control arrangement for a valve as defined in claim 1 wherein said mechanical means reduces the spring force acting on said lever during operation of said lever-operating means.

3. In a control arrangement for a valve as defined in claim 1 wherein said mechanical means is operative to move said spring along the lever and toward the pivot axis thereof to reduce the spring force acting on said lever during operation of said lever-operating means.

4. In a control arrangement for a valve as defined in claim 1 wherein said spring is a coil spring having one end anchored to the housing and its other end attached to said slidable connection for movement to and from said pivotal connection of said valve element and housing.

5. In a control arrangement for a valve as defined in claim 1 wherein said lever-operating means includes a solenoid energizable to operate said lever.

6. In a control arrangement for a valve as defined in claim 1 wherein said mechanical means includes a pin carried by and movable with said lever, said pin supporting said slidable connection for movement along said pin during operation of said lever-operating means and said spring is a coil spring having one end anchored to the housing and its other end attached to said slidable connection.

7. In a control arrangement for a valve as defined in claim 6 wherein said pin extends parallel to said lever.

8. In a control arrangement for a valve as defined in claim 6 wherein said spring other end is slidable along said pin toward the pivot of said lever to reduce the spring force acting on said lever during operating of said lever-operating means.

9. In a control arrangement for a valve as defined in claim 6 wherein said lever-operating means includes a solenoid energizable to operate said lever.

10. In a control arrangement for a valve as defined in claim 1 wherein said lever is pivoted on said housing closely adjacent the pivotal connection of said valve element to said housing.

11. In a control arrangement for a valve having a housing with spaced passages; a valve element in and pivotally connected to said housing; lever means for moving said valve element to alternately close and open respective passages and including a first lever connected to said valve element and having an operating arm exteriorly of said housing, and a second lever extending generally parallel to said arm and pivotally connected at one end to said housing and having its other end pivotally connected to the end of said arm for conjoint movement of said levers; means for operating said lever means to move said valve element to close one of said passages including a spring connected to said second lever and operative to bias said levers and thereby said valve element to passage-closing position; means for actuating said levers to move said valve element, in opposition to the biasing action of said spring, to close the other of said passages; and mechanical means carried by said second lever and modifying the spring force-biasing action on said lever means during operation of said lever-actuating means.

12. In a control arrangement for a valve as defined in claim 11 wherein said mechanical means reduces the spring biasing action on said lever means during operation of said lever-actuating means.

13. In a control arrangement for a valve as defined in claim 11 wherein said mechanical means is operative to move said spring along said second lever toward its said one end thereof to reduce the spring biasing-action on said lever means during operation of said lever-actuating means.

14. In a control arrangement for a valve as defined in claim 11 wherein said mechanical means includes a pin carried by and movable with said second lever, and said spring is a coil spring having one end slidably connected to said pin for movement along said pin during operation of said lever-actuating means.

15. In a control arrangement for a valve as defined in claim 11 wherein said pin extends parallel to said second lever and said spring end is slidable along said pin toward the pivot of said second lever to reduce the spring force acting on said levers during operation of said lever-actuating means.

16. In a control arrangement for a valve as defined in claim 11 wherein said lever-actuating means includes a solenoid connected to the first lever and energizable to operate the levers to move the valve element to passage-closing position.

17. In a control arrangement for a valve as defined in claim 16 wherein said mechanical means includes a pin carried by and movable with said second lever, and said spring is a coil spring having one end slidably connected to said pin for movement along said pin during operation of said lever-actuating means; and said lever-actuating means includes a solenoid connected to said first lever and energizable to operate the levers for movement of said valve element to passage-closing position and for slidable movement of said spring end toward the pivot of said second lever to reduce the spring force acting on said levers.

References Cited

UNITED STATES PATENTS

| 2,488,125 | 11/1949 | Hungate | 251—75 X |
| 2,757,688 | 8/1956 | Klingler | 137—625.44 |
| 3,227,175 | 1/1966 | Remington et al. | 137—625.44 X |

M. CARY NELSON, Primary Examiner

M. O. STURM, Assistant Examiner

U.S. Cl. X.R.

137—625.44; 251—337